US009610633B2

(12) United States Patent
Ohnuma et al.

(10) Patent No.: US 9,610,633 B2
(45) Date of Patent: Apr. 4, 2017

(54) CRANKSHAFT AND METHOD FOR PRODUCING THE SAME

(71) Applicant: HONDA MOTOR CO., LTD., Minato-ku, Tokyo (JP)

(72) Inventors: Takayuki Ohnuma, Tochigi (JP); Tsutomu Ando, Tochigi (JP); Yasuhiro Ito, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 364 days.

(21) Appl. No.: 14/327,369

(22) Filed: Jul. 9, 2014

(65) Prior Publication Data

US 2014/0318310 A1    Oct. 30, 2014

Related U.S. Application Data

(62) Division of application No. 13/868,736, filed on Apr. 23, 2013, now Pat. No. 8,813,358, which is a division
(Continued)

(30) Foreign Application Priority Data

Mar. 26, 2009  (JP) .................................. 2009-075534
Mar. 26, 2009  (JP) .................................. 2009-075948

(51) Int. Cl.
*B21K 1/08*  (2006.01)
*F16C 3/04*  (2006.01)
(Continued)

(52) U.S. Cl.
CPC  *B21K 1/08* (2013.01); *B21J 5/02* (2013.01); *B21J 9/027* (2013.01); *B21J 13/025* (2013.01);
(Continued)

(58) Field of Classification Search
CPC ...... F16C 3/04; F16C 3/06; F16C 3/08; F16C 3/14; F16C 3/16; F16C 3/18; F16C 3/20;
(Continued)

(56) References Cited

U.S. PATENT DOCUMENTS 3,772,763 A    11/1973  Henson et al.
4,015,485 A     4/1977  Ganter-Ullmann et al.
(Continued)

FOREIGN PATENT DOCUMENTS

EP    0 315 137 B1    3/1991
JP      58-2417 U     1/1983
(Continued)

OTHER PUBLICATIONS

Chinese Office Action issued Feb. 21, 2014; Chinese Application No. 201080013837.X.
(Continued)

*Primary Examiner* — Essama Omgba
(74) *Attorney, Agent, or Firm* — Rankin, Hill & Clark LLP

(57) ABSTRACT

In a crankshaft 200, one hole 213L formed in a crankpin 213 has a bottom surface having a larger area and a depth from a surface of the crankpin less than those of another hole 213M. In forming the hole 213L and the hole 213M, a preformed product 200 of the crankshaft having a shape smaller than that of a cavity is disposed in a die set and punches are simultaneously inserted into the crankpin 213. By this operation, the hole 213L and the hole 213M are simultaneously formed in each crankpin 213 of the preformed product 200.

5 Claims, 15 Drawing Sheets

Related U.S. Application Data of application No. 13/259,919, filed as application No. PCT/JP2010/054473 on Mar. 10, 2010, now Pat. No. 8,468,696.

(51) Int. Cl.
| | |
|---|---|
| *B21J 5/02* | (2006.01) |
| *B21J 13/02* | (2006.01) |
| *B21J 13/03* | (2006.01) |
| *F16C 3/08* | (2006.01) |
| *F16C 3/14* | (2006.01) |
| *B21J 9/02* | (2006.01) |

(52) U.S. Cl.
CPC ............... *B21J 13/03* (2013.01); *F16C 3/08* (2013.01); *F16C 3/14* (2013.01); *Y10T 29/17* (2015.01); *Y10T 29/49286* (2015.01); *Y10T 74/2173* (2015.01); *Y10T 74/2185* (2015.01)

(58) Field of Classification Search
CPC ........ F16C 3/22; F16C 11/02; F16C 2220/46; F16C 2220/40; F16C 2220/60; F16C 2220/62; F16C 2220/66; F16C 2220/68; F16C 2220/84; Y10T 29/49286; Y10T 74/2173; Y10T 74/2174; B21K 1/08
See application file for complete search history.

(56) References Cited

U.S. PATENT DOCUMENTS

| | | | | |
|---|---|---|---|---|
| 4,622,933 A * | 11/1986 | Fukuo | ............... | F01M 1/06 123/195 R |
| 4,817,257 A * | 4/1989 | Mascarenas | ........... | B22D 19/00 164/270.1 |
| 5,163,341 A * | 11/1992 | Murrish | ............... | F16C 3/14 123/196 R |
| 5,253,417 A | 10/1993 | Johnson | | |
| 8,371,029 B2 * | 2/2013 | Ito | ............... | B21J 5/06 29/428 |
| 8,468,696 B2 * | 6/2013 | Ohnuma | ............... | B21J 5/02 29/6.01 |
| 8,627,565 B2 * | 1/2014 | Ohnuma | ............... | B21J 5/02 29/6.01 |
| 8,667,947 B2 * | 3/2014 | Ota | ............... | F01M 1/06 123/196 R |
| 8,813,358 B2 * | 8/2014 | Ohnuma | ............... | B21J 5/02 29/6.01 |
| 2004/0187637 A1 | 9/2004 | Gokan | | |
| 2008/0025658 A1 * | 1/2008 | Hochmayr | ............... | F16C 9/02 384/457 |
| 2010/0242241 A1 * | 9/2010 | Ito | ............... | B21J 5/06 29/6.01 |
| 2011/0085865 A1 | 4/2011 | Yoshimoto | | |
| 2011/0308052 A1 * | 12/2011 | Ohnuma | ............... | B21J 5/02 29/6.01 |
| 2012/0024105 A1 * | 2/2012 | Ohnuma | ............... | B21J 5/02 74/605 |

FOREIGN PATENT DOCUMENTS

| | | |
|---|---|---|
| JP | 59-094616 U | 6/1984 |
| JP | 59-94617 U | 6/1984 |
| JP | 59-197336 A | 11/1984 |
| JP | 61-143727 A | 9/1986 |
| JP | 01-135920 A | 5/1989 |
| JP | 1-164811 A | 6/1989 |
| JP | 06-002521 A | 1/1994 |
| JP | 6-66139 A | 3/1994 |
| JP | 6-249230 A | 9/1994 |
| JP | 2002-168228 A | 6/2002 |
| JP | 2005-11431 A | 4/2005 |
| JP | 2005-155873 A | 6/2005 |

OTHER PUBLICATIONS

Japanese Office Action Application No. 2009-075534 dated Jan. 17, 2013, 3 pages.
Japanese Office Action Application No. 2009-075948 dated Jan. 17, 2013, 3 pages.
Microfilm of the specification and drawings annexed to the request of Japanese Utility Model Application No. 29005/1985 (Laid-open No. 143727/1986, Sep. 5, 1986.
Microfilm of the specification and drawings annexed to the request of Japanese Utility Model Application No. 97819/1981 (Laid-open No. 24/17/1983), Yanmar Diesel Engine Co., Ltd._Jan. 8, 1983.

* cited by examiner

Fig. 6B

CRANKSHAFT AND METHOD FOR PRODUCING THE SAME

CROSS-REFERENCED TO RELATED APPLICATION

This application is a Divisional Application of U.S. patent application Ser. No. 13/868,736, filed on Apr. 23, 2013 (now U.S. Pat. No. 8,813,358), which is a Divisional Application of U.S. patent application Ser. No. 13/259,919 (now U.S. Pat. No. 8,468,696), filed Oct. 24, 2011, which is a National stage entry of PCT/2010/054473, filed Mar. 10, 2010 which claims priority to Japanese Patent Application No. 2009-075948, filed Mar. 26, 2009. The disclosures of the prior applications are being incorporated in their entirety by reference.

BACKGROUND OF THE INVENTION

1. Field of the Invention

The present invention relates to a crankshaft and to a method for producing the same, and particularly relates to a technique for forming a hollow hole in a crankpin of the crankshaft.

2. Related Art

An internal-combustion engine is provided with, for example, a crankshaft 10 as shown in FIG. 10. The crankshaft 10 is provided with a journal shaft 11, and a crankpin 13 that is parallel to the journal shaft 11 is connected thereto via an arm 12. A counterweight 12A is formed at the arm 12, and a forming position of the counterweight 12A with respect to the journal shaft 11 is at the opposite side to a connecting position of the crankpin 13.

In the journal shaft 11, a journal shaft side through hole 21 for supplying an oil to a surface of the journal shaft 11 is formed. In the crankpin 13, a pin side through hole 22 for supplying oil to a surface of the crankpin 13 is formed. The journal shaft side through hole 21 and the pin side through hole 22 are connected via an oil flow passage 23. The oil in the journal shaft side through hole 21 is supplied to the surface of the crankpin 13 from the pin side through hole 22 passing through the oil flow passage 23. Reference numeral 24 is a plug 24 for closing an opening of the oil flow passage 23.

In the crankshaft 10 having the above structure, various techniques are proposed for weight saving from the viewpoint of improvement of fuel efficiency. For example, it is proposed that the surface of the arm 12, which is near the crankpin 13 and a journal shaft 11, is entirely formed with recessed grooves (for example, Japanese Patent Application, First Publication No. 2005-114131). Furthermore, it is proposed that a hollow hole is formed in the crankpin 13. In this case, the hollow hole is locally formed, so that rigidity of the crankshaft 10 is not so degraded. Therefore, the hollow hole is preferably formed in the crankpin 13.

For forming the hollow hole, it is proposed to use a forging apparatus provided with a side forming punch that moves perpendicularly with respect to a moving direction of a press ram (for example, Japanese Utility Model Application, Publication No. 61-143727). In this technique, plural holes cannot be simultaneously formed, so that die sets are prepared according to the forming positions of the holes and the holes are individually formed, and therefore, this technique is very complex.

This is a reason why the hollow hole is formed after trimming in a condition in which the crankshaft 10 shown in FIG. 11 is not disposed in a closed space. Specifically, for example, when a hole is formed in the crankshaft 10, as shown in FIGS. 12A to 12C, one surface of one arm 12 (the rightmost arm 12 in FIG. 11) is abutted at a lower die 1 (the shaded area in the Figures) and a punch 2 is inserted into the crankpin 13 from an upper surface side of another arm 12 connected by the crankpin 13. In this case, a mark of abutting may remain on the abutting portion of one surface of one arm 12 (the rightmost arm 12 in FIG. 11) with respect to the lower die 1.

In an internal-combustion engine such as an automobile engine, a crankshaft by which a reciprocating movement of a piston is converted into a rotational movement via a connecting rod is used. The crankshaft is provided with a journal shaft and a crankpin that is parallel to the journal shaft is connected thereto via an arm. A counterweight is formed on the arm and a forming position of the counterweight with respect to the journal shaft is at the opposite side to the connecting position of the crankpin.

The crankshaft is mainly produced by forging using an upper die and a lower die that are separatable. In the forging, a heat-treated material is disposed in a forging press and the material is subjected to various forming using various upper dies and lower dies in the forging press, so that the crankshaft can be obtained.

In automobiles, weight saving of the engine is required for improvement of fuel efficiency, so that a weight of a crankshaft used in the engine is reduced. In weight reduction of the crankshaft, a technique in which a material of the crankshaft is strengthen by modifying quality of the material and a hardening treatment, thereby obtaining a reduced cross section, is mainly used. In this technique, as a material of the crankshaft in the forging, a carbon steel is mainly used and a special steel is used in parts. Furthermore, these materials are partially subjected to high-frequency hardening and a heat-treatment such as a nitriding treatment, if necessary.

A technique for hollowing inner portions of a crankpin and a journal is proposed instead of the above technique in which a hollow crankshaft is formed in a shape having a reduced cross section. In the technique for hollowing the crankshaft, portions except for an oil flow passage are hollowed in an axial direction, so that the hollow crankshaft is much lighter than a solid crankshaft.

As a hollowing technique, a technique in which a hollow hole is formed in a crankpin by boring using a drill is known. A shape of the hole is circular or oval in this technique. When the shape of the hole is complicated, various drills are used in the boring and machining time is extended, so that selectivity in the shape of the hole is decreased.

Therefore, hollowing a crankshaft by forging may be applied. In conventional forging apparatuses, parts of an upper die and a lower die are designed in separatable structures and removal of excess materials created in forming a hole is difficult, so that side forming may be applied. For example, in a forging apparatus disclosed in Japanese Utility Model Application, Publication No. 61-143727, a side forming punch is perpendicularly moved with respect to a moving direction of a press ram by using a cam mechanism moving in conjunction with the press ram, so that a hollow hole is formed in a crankpin.

A hole 13A and a hole 13B are individually formed by the above-explained insertion of a punch 2. In this case, as shown in FIG. 12A, when the punch 2 is inserted from a direction parallel to the journal shaft 11, an upper portion of the journal shaft 11 is deformed toward the lower direction according to the insertion of the punch 2 in forming the hole 13A. In forming the hole 13B, interference with an adjacent portion to the arm 12 occurs, so that the punch 2 cannot be inserted.

As shown in FIG. 12B, when outer circumferential surfaces of the journal shaft 11 and the counterweight 12A of the arm 12 are abutted at the lower die 1 and the punch 2 is inserted from the perpendicular direction with respect to the journal shaft 11, the arms 12 connected by single crankpin 13 to each other are deformed toward the lower direction. As shown in FIG. 12C, in inclining the lower die 1 at a predetermined angle, when the outer circumferences of the journal shaft 11 and the counterweight 12A of the arm 12 are abutted at the lower die 1 and the punch 2 is inserted from the predetermined angular direction, not only are the arms 12 connected by single crankpin 13 to each other deformed toward the lower direction, but also inclining deformation toward the inclining direction of the lower die 1 occurs in the counterweight 12A.

In these techniques shown in FIGS. 12A to 12C, portions of the crankshaft 10 and crankpin 13 except for portions abutting at the lower die 1 are not restrained, so that these portions not abutting thereto are deformed. In this case, surface shrinkage in the axial direction of the crankpin 13 occurs on end surfaces around openings of the holes 13A and the 13B of the crankpin 13 and burrs are formed at the edges around the openings thereof. Therefore, predetermined dimensional accuracy of the crankshaft 10 cannot be obtained, and an operation for removing the burrs is added. Furthermore, major balancing correction such that a large number of holes (not shown in Figures) are formed in a counterweight 12A of the arm 12 is required, so that production cost is increased. When the holes 13A and 13B are deformed, a defective portion is formed in machining the oil flow passage 23 (shown only in FIG. 10) after forming the holes 13A and 13B.

SUMMARY OF THE INVENTION

Therefore, an object of the present invention is to provide a crankshaft and a method for producing the same, in which not only can weight reduction be satisfied by forming a hole in a crankpin but also degradations of dimensional accuracy and product strength can be avoided.

The oil flow passage for supplying oil from the through hole of the journal shaft to a surface of the crankpin is formed in the crankpin after forming the hole, so that the hole is formed avoiding intersection with a predetermined position in which the oil flow passage is formed. Viscosity of an oil supplied to a sliding portion of the crankshaft was decreased by high temperature of the portion around a combustion chamber in a high-load operation of an internal-combustion engine, so that seizing may occur in the sliding portion. In this case, the oil is cooled by an oil cooler, but a cooling effect thereof was not sufficient.

Therefore, an object of the present invention is to provide a crankshaft and a method for producing the same, in which seizing in a sliding portion of the crankshaft can be avoided.

The present invention provides a crankshaft including a crankpin; a first hole formed in one side of the crankpin; and a second hole formed in another side thereof; in which the first hole has a bottom surface having an area larger than that of the second hole and a depth from a surface of the crankpin less than that of the second hole.

The crankshaft of the present invention can be obtained by a following method for producing the crankshaft. That is, the present invention provides a method for producing the crankshaft including preforming the crankshaft having a crankpin; and forging a preformed product disposed in a cavity of a separatable die set composed of an upper die and a lower die; forming a first hole and a second hole in the crankpin by simultaneously inserting punches into both sides of the crankpin in the forging, thereby filling the cavity with a material of the preformed product, in which a shape of the preformed product is smaller than a shape of the cavity of the die set in the preforming, and the first hole and the second are formed such that the first hole has a bottom surface having an area larger than that of the second hole and a depth from a surface of the crankpin less than that of the second hole.

In the method for producing the crankshaft of the present invention, the preformed product of the crankshaft is subjected to the forging using the separatable die set composed of the upper die and the lower die. In this case, the shape of the preformed product of the crankshaft is formed to be smaller than a shape of the cavity of the die set used in the forging. In the forging, the cavity of the die set is filled with a material of the preformed product by inserting a punch into the crankpin. Therefore, the shape of the cavity of the die set is set to coincide with a required shape of the crankshaft, so that the required shape of the crankshaft can be obtained by the forging.

Not only can weight reduction be satisfied by forming the hollow hole in the crankpin, but also dimensional accuracy of the crankshaft can be improved since the forging is performed in a closed space and the material fills the cavity.

In the method for producing the crankshaft of the present invention, the punches are simultaneously inserted into both sides of the crankpin in forging in the closed space, so that deformation of the hole (occurrence of surface shrinkage and forming burrs in the vicinity of the formed hole at one side of the crankpin in forming a hole at another side thereof by insertion of the punch) can be avoided. By this operation, dimensional accuracy can be further improved. Therefore, increase of production cost by increase of balancing correction by forming plural holes in the counterweight can be avoided.

After forming the hole having a described structure in the crankpin, when the oil flow passage connecting the crankpin side through hole formed at the center portion of the crankpin and the journal shaft side through hole formed at the center portion of the journal shaft between the arms is formed, in forming the holes, one hole has a bottom surface having an area larger than that of another hole and a depth from a surface of the crankpin less than that of another hole, so that the oil flow passage for supplying enough oil can be formed in the shortest linear distance by precisely positioning the holes having different shapes from each other according to a condition of the oil flow passage. In this case, deformation in forming the hole does not occur, so that a defective portion is not formed in shaping the oil flow passage.

In the crankshaft of the present invention obtained by the above steps, not only can weight reduction be satisfied, but also dimensional accuracy can be improved by forming the hole in the crankpin, so that rotational balance is favorable and product strength is improved.

The method for producing the crankshaft of the present invention can be used with various structures. For example, in disposing a preformed product in forging, the maximum length of a clearance between the preformed product and the cavity of the die set can be set to be more than 0 mm and 0.5 mm or less. In this case, the clearance (gap) is formed along a surface of the preformed product between the preformed product and the cavity of the die set. The maximum length of the clearance is the gap at a position in which a distance between the preformed product and a surface of the cavity of the die set is the maximum. In this aspect, the crankshaft can be stably removed from the die set and inclining deformation of the counterweight of the crankshaft can be avoided in the forging.

The present invention provides a crankshaft including a crankpin; a hole having a hollow structure formed on a surface of the crankpin; and an oil flow passage formed in an inside of the crankpin; in which the hole has plural surfaces and one surface most proximate to the oil flow passage is extended in a direction substantially parallel to the oil flow passage.

In the crankshaft of the present invention, the surface of the hole, which is most proximate to the oil flow passage, is extended in the direction substantially parallel to the oil flow passage, so that a wall portion between the surface and the oil flow passage is thin and the surface area of the arm connected to the crankpin is increased. Therefore, radiation performance of the arm can be improved, so that the temperature of the oil flowing in the oil flow passage can be reduced when temperatures of portions around a combustion chamber of an internal-combustion engine are high. As a result, viscosity of the oil can be improved, so that seizing on the sliding portion of the crankshaft can be avoided.

The method for producing the crankshaft of the present invention is a method by which the crankshaft of the present invention can be produced. That is, the present invention provides a method for producing a crankshaft having a crankpin and an oil flow passage formed in an inside of the crankpin, and the method includes: forming a hole having a hollow structure on a surface of the crankpin; and forming the oil flow passage in the inside of the crankpin avoiding the hole; in which the hole has plural surfaces and one surface most proximate to the oil flow passage is extended in a direction substantially parallel to the oil flow passage.

The method for producing the crankshaft of the present invention can obtain similar effects to that of the crankshaft of the present invention. The method for producing the crankshaft of the present invention can be used with various structures for improving various characteristics thereof.

For example, the hole can be formed by forming in forging. In this case, the shape of the hole is preferably set as follows. That is, the hole is formed in a shape in which a straight line dividing a cross-section area of the crankpin in half on a cross section containing an axis of the journal shaft passes trough a journal shaft side surface of the crankpin.

In this aspect, the hole is formed by the forging, so that forming a sharp edge at the opening of the hole can be avoided in contrast with a case of machining. Therefore, a polishing step by hand working for avoiding a stress concentration is unnecessary, and therefore, production steps can be reduced. Furthermore, fiber flow is newly formed along the shape of the hole, so that wear resistance can be improved compared to a drilled product formed by machining.

In forging, the hole is formed in a shape in which the straight line dividing the section area of the crankpin in half on the cross section containing the axis of the journal shaft passes through the journal shaft side surface of the crankpin, so that structures of the journal shaft side surface of the crankpin can be fine, and therefore, a fatigue strength can be improved. The journal shaft side of the crankpin is a portion to which stress is concentrated in operating the internal-combustion engine, so that improvement of endurance strength is important.

According to the crankshaft and the method for producing the same, not only can weight reduction be satisfied but also dimensional accuracy of the crankshaft can be improved by forming the hollow hole in the crankpin, so that increase of production cost by increase of balancing correction such that plural holes are formed in the counterweight can be avoided. The oil flow passage formed in the shortest linear distance can be obtained and the defective portion is not formed in machining the oil flow passage.

According to the crankshaft and the method for producing the same, radiation performance of the arm can be improved, so that the temperature of the oil flowing in the oil flow passage can be lowered. As a result, an effect, such as an effect for avoiding seizing of the sliding portion of the crankshaft, can be obtained.

BRIEF DESCRIPTION OF DRAWINGS

FIGS. 5A to 5C are views showing a schematic structure of the crankshaft in accordance with the embodiment of the present invention, wherein FIG. 5A is a cross-sectional side view of the crankshaft, FIG. 5B is a bottom view of a hole formed in one side of a crankpin and FIG. 5C is a bottom view of a hole formed in another side of the crankpin.

FIGS. 6A and 6B are views for explanation of a problem of a method for producing a crankshaft of a comparative embodiment.

FIGS. 20A and 20B are views showing fiber flows formed in a forged crankshaft, wherein FIG. 20A is a conceptual diagram of a fiber flow in the forged crankshaft before machining and FIG. 20B is a conceptual diagram of a fiber flow in the forged crankshaft after the machining.

FIGS. 22A and 22B are photographs showing conditions of the forged crankshaft in which a hole is formed by the forging, wherein FIG. 22A is a photograph showing a condition of the arm containing the hole and FIG. 22B is a photograph showing a condition of the hole.

FIGS. 23A and 23B are photographs showing a crankpin of the comparative example, in which a hole is not formed, wherein FIG. 23A is a photograph showing a total structure of the crankpin and FIG. 23B is a photograph taken by an optical microscope showing components of a cross section of a portion at 10 mm depth from a surface of the hole.

FIG. 24B is a photograph taken by the optical microscope, which shows a structure of a cross section of a portion at 10 mm depth from the surface of the hole.

DESCRIPTION OF THE PREFERRED EMBODIMENTS

1, First Embodiment

Figure 1:
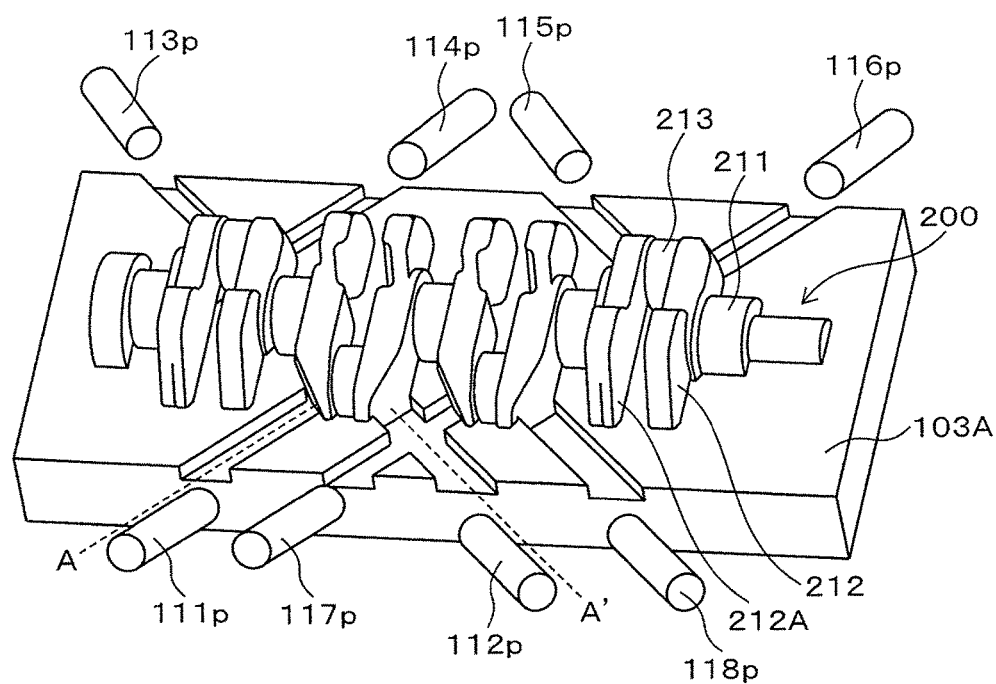
FIG. 1 is a conceptual diagram showing a forging apparatus used in a method for producing a crankshaft in accordance with an embodiment of the present invention, and is a schematic view showing a lower die of the forging apparatus.
Figure 2:
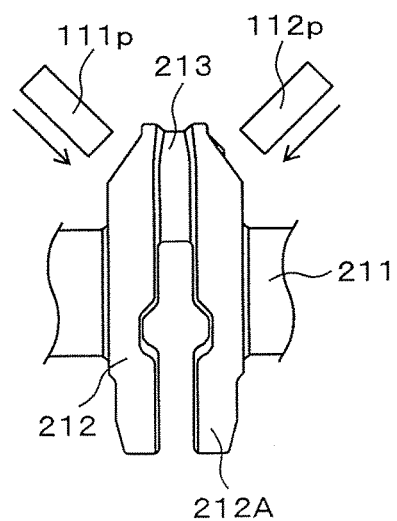
FIG. 2 is a view for explanation of forming a hole by the method for producing the crankshaft in accordance with the first embodiment of the invention.
Figure 3:
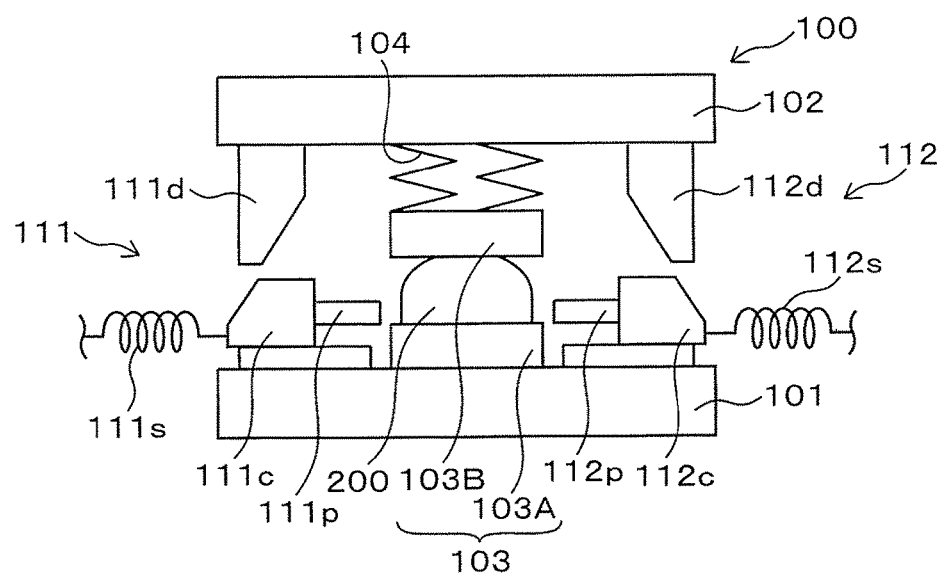
FIG. 3 is a conceptual diagram of the forging apparatus used in the method for producing the crankshaft in accordance with the embodiment of the present invention and is a cross-sectional side view taken along a line A to A' in FIG. 1 showing a schematic structure of the forging apparatus.

An embodiment of the present invention is explained with reference to Figures hereinafter. FIGS. 1 and 3 are conceptual diagrams showing a forging apparatus 100 used in a method for producing a crankshaft in accordance with the embodiment of the present invention. FIG. 3 is a diagram for explanation of forming a hole by the forging apparatus 100 shown in FIG. 1 and FIG. 2. FIG. 1 is a schematic view showing a lower die of the forging apparatus 100. FIG. 3 is a cross-sectional side view taken along a line A to A' in FIG. 1 showing a schematic structure of the forging apparatus 100. In FIG. 3, each portion (in particular, a die set 103) of the forging apparatus 100 is simply shown.

The forging apparatus 100 is an example of an apparatus to which the method for producing the crankshaft of the present invention is applied and is an apparatus for obtaining a crankshaft for a four-cylinder engine. As shown in FIG. 3, the forging apparatus 100 is provided with, for example, a press bolster 101 and a press ram 102 supported at the upper side of the press bolster 101. A die set 103 is disposed between the press bolster 101 and the press ram 102.

The die set 103 is provided with a lower die 103A, an upper die 103B and side forming punches 111p to 118p (hereinafter, simply described as "punches 111p to 118p). The upper die 103B is movably provided with respect to the lower die 103A. Reference numeral "104" in FIG. 3 is a load adjusting portion (a means such as an oil pressure means or an air pressure means) for adjusting initial load to the upper die 103B. When a volume of a preformed product 200 is greater than a predetermined value, the upper die 103B is moved toward a direction to which the die set is opened (an upper direction) according to forming pressure in the die set 103.

The preformed product 200 of the crankshaft is disposed in the die set 103. The preformed product is provided with a journal shaft 211 and a crankpin 213 that is parallel to the journal shaft 211 is connected thereto via an arm 212. A counterweight 212A is formed in the arm 212 and a forming position of the counterweight 212A with respect to the journal shaft 211 is at the opposite side to a connecting position of the crankpin 213.

The punches 111p to 118p are movably provided in a perpendicular direction with respect to a moving direction of the upper die 103B. Specifically, the punches 111p and 112p are movable toward the inside of the die set 103 along punching holes 111a to 118a formed in a side portion of the die set 103.

The punches 111p to 118p are provided with cam mechanisms that move in conjunction with a movement of the press ram 102 for moving the punches into the inside of the die set 103. As shown in FIG. 3, a cam mechanism 111 is provided with a cam 111c and a cam driver 111d for driving the cam 111c and a cam mechanism 112 is provided with a cam 112c and a cam driver 112d for driving the cam 112c. Cam mechanisms of the punches 113p to 118p have substantially the same structure and movement as those of the punches 111p and 112p, and therefore explanations and diagrams thereof are omitted hereinafter.

The punches 111p and 112p are provided to side surfaces, which face the die set 103, of the cams 111c and 112c. Side surfaces, which face the opposite side to the die set 103, of the cams 111c and 112c, are inclined. Bottom surfaces of the cam drivers 111d and 112d are inclined surfaces which are disposed via a predetermined interval with respect to the inclined surfaces of the cams 111c and 112c in initial conditions of the cam drivers. The cam drivers 111d and 112d are downwardly moved according to a downward movement of the press ram 102 and the bottom surfaces of the cam drivers 111d and 112d contact to the inclined surfaces of the cams 111 and 112, whereby these surfaces thereof slide relative to each other.

Retracting members 111s and 112s are provided to the cam mechanisms 111 and 112. After finishing the side forming by the punch 111p and the punch 112p when the press ram is disposed at the bottom dead point thereof, the cam drivers 111d and 112d are upwardly moved according to an upward movement of the press ram 102 toward the top dead point, so that the side forming punches 111p and 112p are retracted toward the outside of the die set 103 by the retracting members 111s and 112s and are moved back to the initial positions thereof.

By using the cam mechanism having this structure, for example, insertions of the punches 111p and 112p into both sides of the crankpin 213 and insertions of the punches 113p and 114p thereinto shown in FIG. 1 are simultaneously performed. Next, insertions of the punches 115p and 116p and insertions of the punches 117*p* and 118*p* are simultaneously performed. FIG. 2 shows a condition in which the punches 111*p* and 112*p* are inserted into both sides of the crankpin 213. When the insertions of the punches 111*p* to 118*p* are performed in one working step of the press ram 102 from the upper dead point to the bottom dead point thereof, for example, a method for avoiding interference between punches with each other proposed in Japanese Patent Application, First Published No. 2009-27050 by the present applicant is preferably used.

The preformed product 200 of the crankshaft is disposed in the die set 103 of the forging apparatus 100. In disposing the preformed product 200, the axial direction of the journal shaft 211 is perpendicular with respect to the moving direction of the press ram 102. Inserting directions of the punches 111*p* to 118*p* are set at directions in which interference to the adjacent counterweight of the arm can be avoided. For example, an angle θ (shown in FIG. 5A) between the inserting direction and a perpendicular line with respect to the axis of the center portion of the crankpin 213 is preferably set at 45°.

The preformed product 200 is subject to trimming and is formed in a shape smaller than a required shape of the crankshaft. The cavity of the die set 103 is formed in a shape coinciding with the required shape of the crankshaft. In this case, when the preformed product 200 is disposed in the die set, a clearance is provided between the preformed product and the cavity of the die set 103 and maximum length of the clearance is preferably set more than 0 mm and 0.5 mm or less.

The method for producing the crankshaft of the present embodiment using this forging apparatus 100 is explained primarily with reference to FIGS. 1 to 5C. First, the preformed product 200 is disposed on the lower die 103A of the die set 103. Next, the insertions of the punches 111*p* and 112*p* into both sides of the crankpin 213 and the insertions of the punches 113*p* and 114*p* thereinto are simultaneously performed by the downward movement of the press ram from the top dead point to the bottom dead point thereof. Furthermore, the insertions of the punches 115*p* and 116*p* and the insertions of the punches 117*p* and 118*p* are simultaneously performed. By these operations, holes are simultaneously formed in both sides of each crankpin 213 of the preformed product 200. After forming holes, the crankshaft is removed from the die set 103.

In the present embodiment, the preformed product 200 is preformed in a shape smaller than the required shape (that is, a shape of the cavity of the die set) of the crankshaft. In forging, the preformed product 200 is closed in the die set 103 and the side forming punches 111*p* to 118*p* are inserted into the crankpin of the preformed product 200, so that the holes are formed in the crankpin and the die set 103 can be filled with the material of the preformed product 200.

Figure 4:
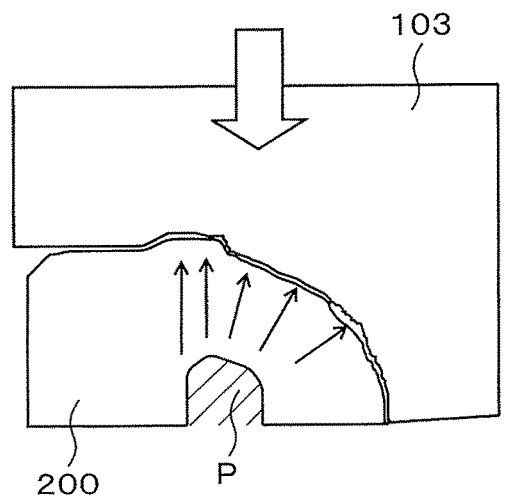
FIG. 4 is a conceptual diagram for explanation of the method for producing the crankshaft in accordance with the embodiment of the present invention

FIG. 4 is a conceptual diagram for explanation of the method for producing the crankshaft of the present embodiment and shows a case in which a hole is formed by one punch P. In FIG. 4, a downward pointing arrowhead indicates a direction of restraining pressure from the die set 103 to the preformed product 200 and upward pointing arrowheads indicate directions to which the preformed product 200 is filled. As shown in FIG. 4, when the preformed product 200 formed in a shape smaller than that of the cavity is disposed in the cavity of die set 103, even though a clearance is provided between the preformed product 200 and the cavity, the cavity can be filled with the material by inserting the side forming punch P into the preformed product 200.

In the forging, the die set 103 is filled with the material of the preformed product 200 by inserting the punches 111*p* to 118*p* into the crankpin, so that the required shape of the crankshaft can be obtained by setting the shape of the cavity of the die set 103 so as to coincide with the required shape of the crankshaft.

In forging of the present embodiment performed in the closed space of the die set 103, the insertions of the punches 111*p* and 112*p* into both sides of the crankpin 213 are simultaneously performed and the insertions of the punches 113*p* and 114*p* thereinto are simultaneously performed. Furthermore, the insertions of the punches 115*p* and 116*p* into both sides of the crankpin 213 are simultaneously performed and the insertions of the punches 117*p* and 118*p* thereinto are simultaneously performed. By these operations, deformation of the hole that occurs in forming the hole by conventional techniques can be avoided (occurrence of surface shrinkage and forming burrs in a portion in the vicinity of a formed hole at one side in forming a hole by inserting a punch at another side thereof by insertion of the punch at another side), so that dimensional accuracy can be further improved.

In disposing the preformed product 200 in the above forging, the maximum length of the clearance between the preformed product 200 and the cavity of the die set 103 is preferably set to be more than 0 mm and 0.5 mm or less.

Figure 7A:
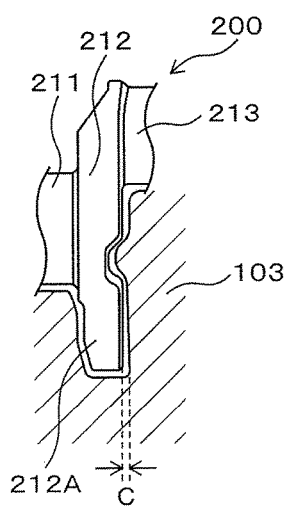
FIGS. 7A to 7C are cross-sectional side views showing various disposing conditions of a preformed product of the crankshaft in a die set in the method for producing the crankshaft.
Figure 7B:
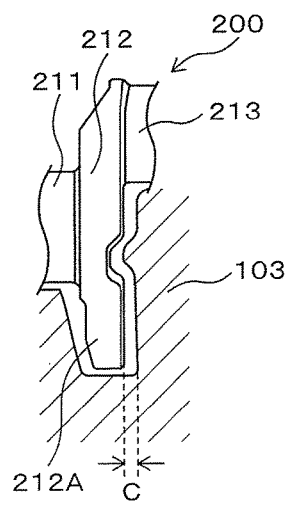
Figure 8A:
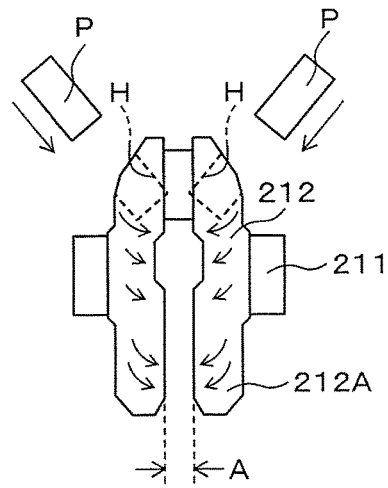
FIGS. 8A and 8B are diagrams for explanation of inclining deformation occurring in the method for producing the crankshaft of the comparative embodiment.

For example, as shown in FIG. 7B, when the maximum length C of the clearance is more than 0.5 mm, inclining deformation occurs in the counterweight 212A of the crankshaft 200. Specifically, as shown in FIG. 8A, when the punch P is inserted into the preformed product 200, the material is moved toward the directions indicated by arrows shown in the Figures. In this case, rigidity remains in a portion supported by the journal shaft 211 in the arm 212, so that deformation hardly occurs.

Figure 8B:
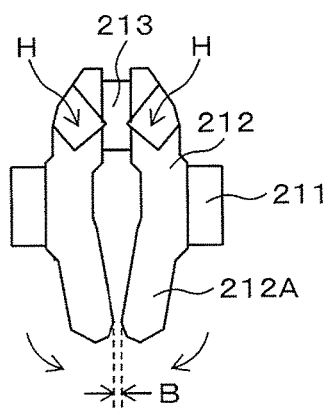

In contrast, the counterweight 212A of the arm 212 is not restrained, so that rigidity thereof is small and large deformation occurs. As a result of forming a hole H, in an adjacent portion of the arm 212, as shown in FIG. 8B, inclining deformation occurs in a condition in which counterweights 212A are approximated to each other. Furthermore, when holes 213L and 213M (in FIGS. 5A to 5C) having different shapes from each other are formed at both sides of the crankpin 213, deformation of the counterweight 212A depends on the shapes of the hole 213L and the hole 213M, so that shapes of the counterweights 212A at both sides differ from each other. Therefore, balancing correction in a working step thereafter (balancing correction by forming a drilled hole in a bottom portion of the counterweight 212A) is difficult.

Figure 7C:
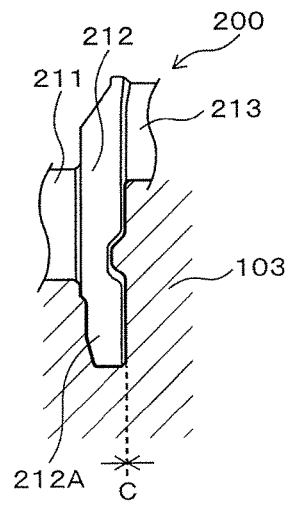

On the other hand, as shown in FIG. 7C, when the maximum length C of the clearance is set at 0 mm, disposing the preforming product 200 in the cavity of the die set 103 is difficult. Therefore, as shown in FIG. 7A, by setting the maximum length C more than 0 mm and 0.5 mm or less, the preforming product 200 can be easily disposed in the cavity of the die set 103 and inclining deformation of the counterweight 212A in forging can be avoided.

Figure 5A:
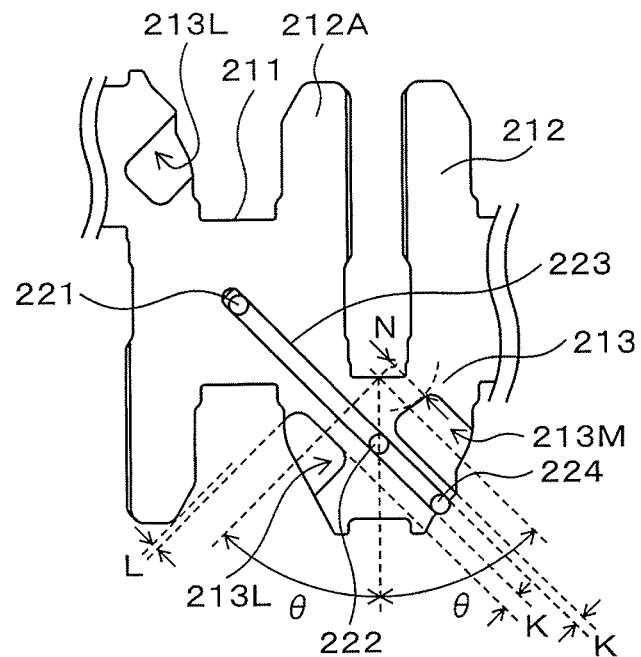
Figure 5B:
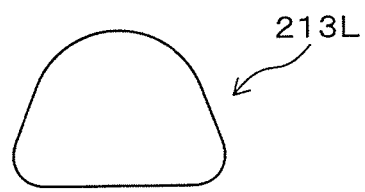
Figure 5C:
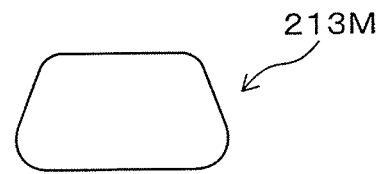

After forming the hole by the above step, an oil flow passage 223 connecting a crankpin side hole 222 formed in a center portion of the crankpin 213 and a journal shaft side hole 221 formed in a center portion of the journal shaft 211 is formed. FIGS. 5A to 5C are cross-sectional side views showing a schematic structure of the crankshaft. In the present embodiment, in forming the above holes, the bottom area of the hole 213L is set larger than that of the hole 213M, and the depth of the hole 213L from the surface of the crankpin 213 is set less than that of the hole 213M so that the oil flow passage 223 can be formed in the shortest linear distance.

Figure 6A:
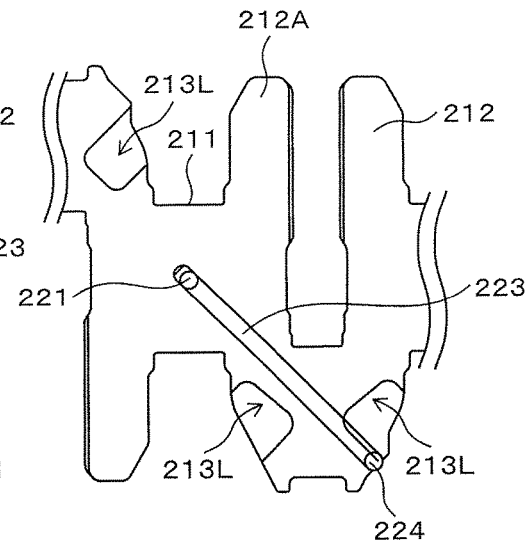

In this case, for example, as shown in FIG. 6A, if the hole 213M of which depth from the surface of the crankpin is deeply set is formed in each side of the crankpin 213, the hole 213M on the left hand in the drawing overlaps with the oil flow passage 223 formed in the shortest linear distance. Furthermore, for example, as shown in FIG. 6B, if the hole 213L of which the bottom area is largely set is formed in each side of the crankpin 213, the hole 213L on the right hand in the drawing overlaps with the oil flow passage 223 formed in the shortest linear distance.

Therefore, as shown in FIG. 5A, by positioning the hole 213L and the hole 213M having the different structures from each other at the positions in which the overlap with the working portion for the oil flow passage 223 can be avoided, the oil flow passage which can supply sufficient amount of oil can be formed in the shortest linear distance. In this case, deformation does not occur in forming the holes 213L and 213M, so that no defective portion is formed in working the oil flow passage.

As described above, in the present embodiment, not only can weight reduction be satisfied, but also dimensional accuracy can be improved by forming the hollow holes 213L and 213M, so that increase of production cost by increase of the number of holes such as plural drilled holes for balancing correction can be avoided. Furthermore, the oil flow passage 223 can be formed in the shortest linear distance and the defective portion is not formed in working thereof.

2. Second Embodiment

2-1. Structure of Crankshaft

Figure 13:
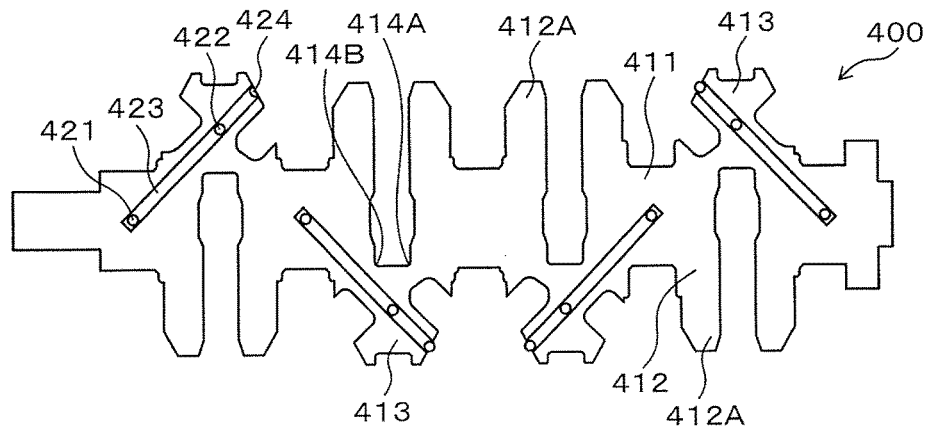
FIG. 13 is a cross-sectional side view showing a structure of the crankshaft in accordance with the embodiment of the present invention.

An embodiment of the present invention is explained with reference to the drawings hereinafter. FIG. 13 is a cross-sectional view showing a structure of a crankshaft 400 in accordance with the embodiment of the present invention. The crankshaft 400 is provided with a journal shaft 411 and a crankpin 413 parallel to the journal shaft 411 is connected thereto via an arm 412.

A counterweight 412A is formed at the arm 412 and a forming position of the counterweight 412A with respect to the journal shaft 411 is opposite side to a connecting position of the crankpin 413. Hollow holes 413A and hole 413B are formed at both sides of the crankpin 413. Fillets 414A and 414B are formed on journal shaft 411 side surfaces of boundaries between the crankpin 413 and the arm.

A journal shaft side through hole 421 for supplying an oil to a surface of the journal shaft 411 is formed in the journal shaft 411. A pin side through hole 422 for supplying an oil to a surface of the crankpin 413 is formed in the crankpin 413. The journal shaft side through hole 421 and the pin side through hole 422 are connected via an oil flow passage 423. An oil in the journal shaft side through hole 421 is supplied to the surface of the crankpin 413 from the pin side through hole 422 passing through the oil flow passage 423. A plug 424 is fixed to an opening of the oil flow passage 423 for closing the opening. The oil flow passage 423 is worked after forming holes 413A and 413B.

2-2. Structure of Hole

Figure 14:
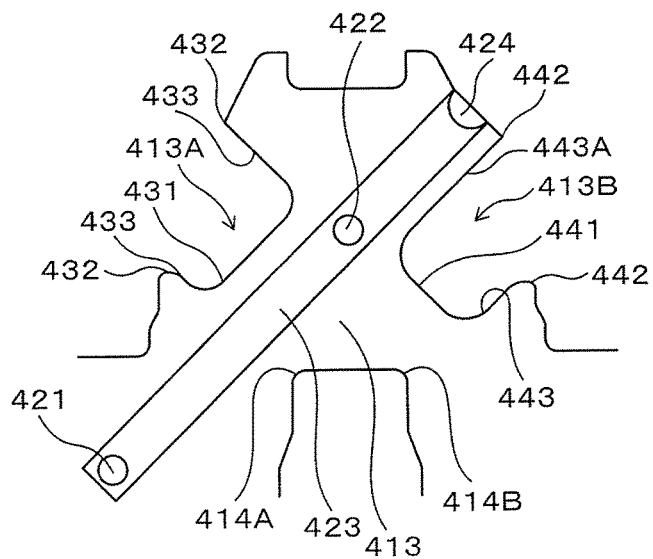
FIG. 14 is a cross-sectional side view showing a partially enlarged structure of the crankpin of the crankshaft shown in FIG. 13.
Figure 15A:
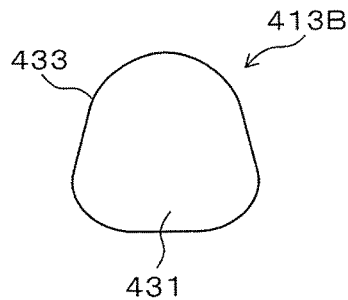
FIGS. 15A and 15B are front views showing structures of holes formed in the crankpin shown in FIG. 13.
Figure 15B:
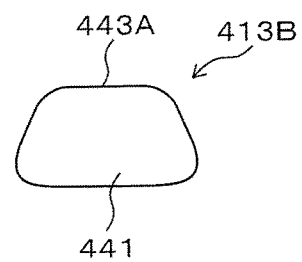

2-2-A. Cooling Effect Based on Relationship of Arrangement Between Hole and Oil Flow Passage FIG. 14 is a cross-sectional side view showing an enlarged portion of the structure of the crankpin 413 of the crankshaft 400 shown in FIG. 13. FIGS. 15A and 15B are front views showing structures of the holes 413A and 413B formed in the crankpin 413.

The hole 413A has a bottom surface 431 and an opening edge 432 and a side surface 433 is formed between the bottom surface 431 and the opening edge 432. In the hole 413A, the bottom surface 431 that is most proximate to the oil flow passage 423 is extended in a direction substantially parallel to the oil flow passage 423. The hole 413B has a bottom surface 441 and an opening edge 442 and a side surface 443 is formed between the bottom surface 441 and the opening edge 442. The side surface 443 of the hole 413B contains a side surface 443A that is most proximate to the oil flow passage 423, and the side surface 443A is extended in the direction substantially parallel to the oil flow passage 423.

The bottom surface 431 in the hole 413A and the side surface 443A in the hole 413B are most proximate to the oil flow passage 423 and are extended in the direction substantially parallel to the oil flow passage 423, so that wall portions between the surfaces 431 and 443A and the oil flow passage 423 are thin and a surface area of the arm 412 is enlarged. Radiation performance of the arm 412 can be improved by forming the holes 413A and 413 having these structures. In this case, straight lines dividing each section area in half of one surface 431 and one surface 443A that are most proximate to the oil flow passage 423 are extended in the direction substantially parallel to the oil flow passage 423, and surfaces 431 and 443A preferably surround the oil flow passage 423 while including the straight lines at the center of the surfaces 431 and 443.

2-2-B. Effect Based on Weight Saving

Figure 16:
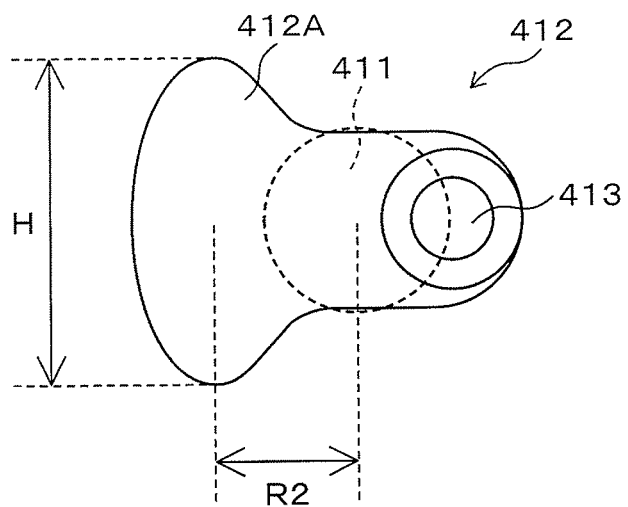
FIG. 16 is a view showing a schematic structure of an arm for explanation of an effect of weight saving by forming the hole.

Not only weight reduction of the crankshaft 400, but also the following effects, can be obtained by forming the hollow holes 413A and 413B. FIG. 16 is a view showing a schematic structure of the arm 412 for explanation of an effect of weight saving by forming a hole. In FIG. 16, illustration of the holes 413A and 413B is omitted.

The amount of a material disposed in a forging die set can be reduced by forming the hollow holes 413A and 413B. Furthermore, the load on the die set in the forging can be reduced by lowering a height H of a counterweight 412A (shown in FIG. 16) by forming the hollow holes 413A and 413B. As a result, service life of the die set can be improved. By the above structure, forging cost can be reduced. According to an effect obtained by the weight saving of the holes 413A and 413B, the following structure is preferably applied to the holes 413A and 413B.

In the hole formed by a conventional technique, a cross-sectional shape thereof is circular or oval and a bottom surface is flat. In the crankshaft 400 of the present embodiment, the counterweight 412A is formed at the opposite side to the connecting portion of the crankpin 413 with respect to the journal shaft 411, so that the holes 413A and 413B are preferably formed at positions in which the crankpin and counterweight 412A can be balanced.

When a weight of the crankpin side portion is defined as "W1" and a position of the center of gravity thereof is defined as "R1", and a weight of the counterweight side portion is defined as "W2" and a position of the center of gravity thereof is defined as "R2" (shown in FIG. 16), balancing amount between the crankpin 413 and the counterweight 412A can be expressed by an equality of the formula $W1 \times R1 = W2 \times R2$. The counterweight 412A is a portion for obtaining dynamic balance, so that weight reduction of the counterweight 412A can be obtained by weight reduction of the crankpin 413 at the opposite side to the journal 411. Therefore, the forming positions of the holes 413A and 413B in the crankpin 413 are determined at the journal shaft 411 side thereof so that the position of the center of gravity of the crankpin 413 can be set at the outer side portion thereof. Furthermore, cross-sectional shapes, depths and bottom surface positions of the holes 413A and 413B are designed in suitable structures for arranging the oil flow passage 423, so that the holes 413A and 413B can be determined in shapes in which a great effect (reduction of forging cost) by weight reduction can be satisfied.

2-2-C. Effect Based on Forging 2-2-C-1. Forming Curved Shape on Opening Edge of Hole If a shape of a cross section of the hole is circular or oval and the bottom surface thereof is flat, a hole can be formed in a short time by machining of the conventional techniques. However, in the machining of the conventional techniques, a large number of machining centers and various drills are required for forming the holes 413A and 413B of the present embodiment, so that production cost is increased and machining time is lengthened. In forming the hole by machining, as shown in FIG. 17, opening edges 432 and 442 of the holes are formed in sharp edge. The opening edges 432 and 442 are subject to a polishing step by hand working to avoid concentration of stress by forming the opening edges 432 and 442 of the holes 413A and 413B in the sharp edge, so that the number of working steps is increased.

Figure 17A:
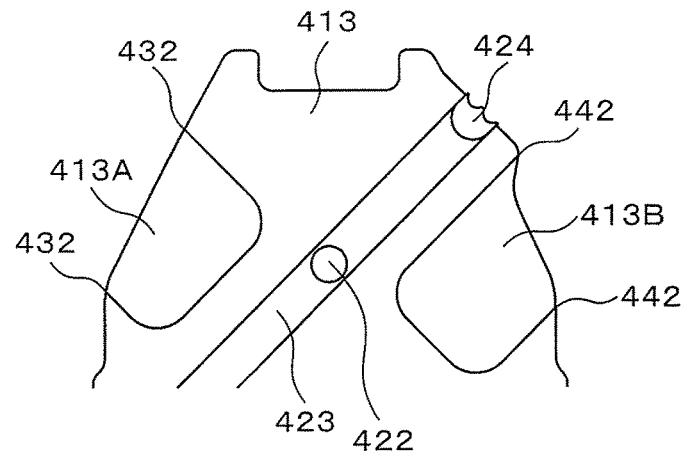
FIGS. 17A to 17C are cross-sectional views showing shapes of holes formed by various methods.
Figure 18A:
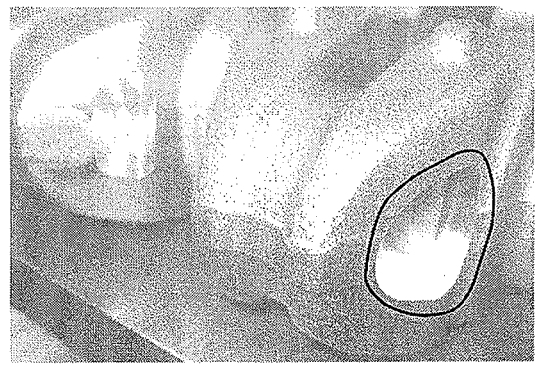
FIGS. 18A to 18C are photographs of the shapes of the holes formed by the various methods of experimental example and comparative example.

FIG. 17A is a cross-sectional view showing shapes of the holes 413A and 413B formed by machining. In the described machining, as shown in FIG. 18A, the opening edges 432 and 442 of the holes 413A and 413B were formed in sharp edge in a comparative example. FIG. 18A is a photograph of the hole 413B formed by machining in the comparative example (the hole in a frame in FIG. 18A).

On the other hand, the holes 413A and 413B are formed by forging in the present embodiment. In the forging, a forging apparatus is used and is provided with a vertically separatable die set which is provided with a side forming punch which is perpendicularly moved. In the forging apparatus, a material of the crankshaft is disposed on the lower die. Furthermore, not only is the material closed in the separatable die set, but also the side forming punch is inserted into a crankpin by downward movement of the upper die toward the lower die by a press ram. By this step, the crankshaft 400 provided with the hollow holes 413A and 413B can be obtained. In this case, a cam mechanism is preferably used as a driving source of the side forming punch. Because the driving mechanism which has a simple structure compared to a servomotor and an oil pressure means may not be disposed at the outside of the die set and can be linearly followed according to movement of the press ram.

Forming the hole by forging can be performed by inserting the side forming punch, so that shapes of the holes 413A and 413B can be determined by shapes of the punches. Therefore, selectivity in the shapes of the holes 413A and 413B can be improved and production cost can be reduced compared to a case of forming a hole by machining.

Figure 17B:
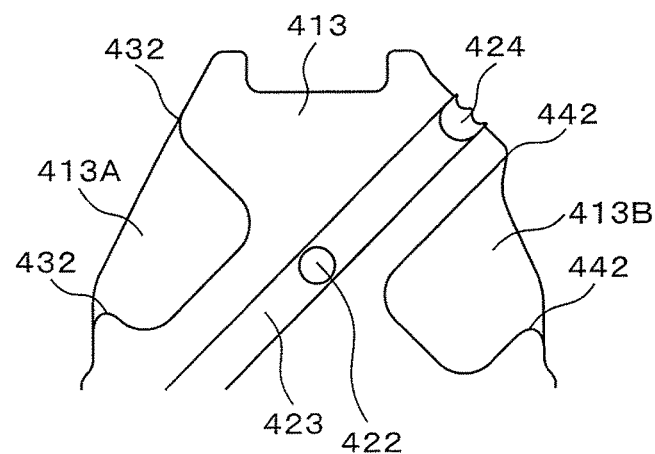
Figure 17C:
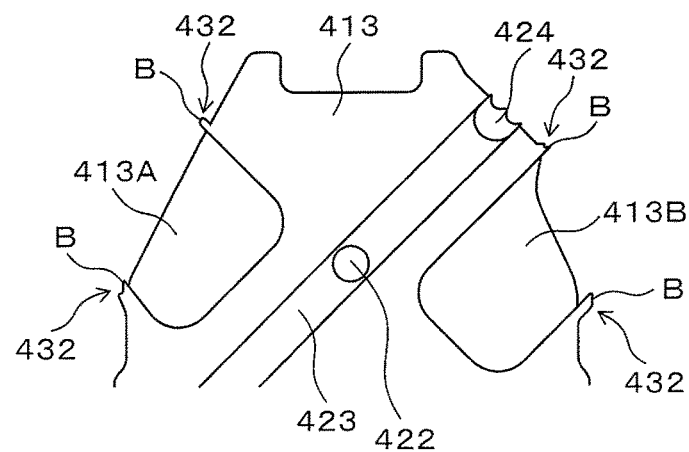
Figure 18B:
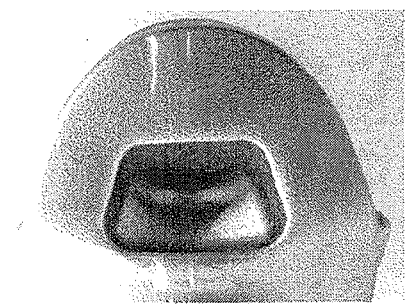
Figure 18C:
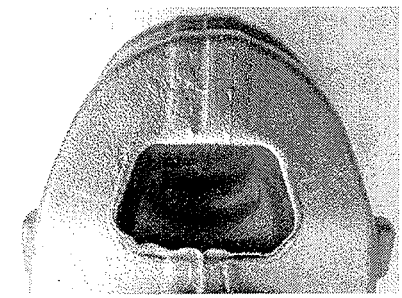

When a volume of the material of the crankshaft is excessive, as shown in FIG. 17C, burrs B are formed at the opening edges 432 and 442 of the holes 413A and 413B when the vertically separatable die set is closed. FIG. 17C is a cross-sectional view showing the shapes of the holes 413A and 413B when the volume of the material of the crankshaft is excessively set. In a case of this condition setting, as shown in FIG. 18C, it was confirmed that the burrs B were formed at the opening edges 432 and 442 of the holes 413A and 413B in the comparative example. FIG. 18C is a photograph of the holes 413A and 413B of the comparative example formed when the volume of the material of the crankshaft was excessively set (the left photograph shows the hole 413A and the right photograph shows the hole 413B).

In the present embodiment, the forging is performed after the volume of the material is previously calculated for avoiding occurrence of the burr B at the opening edges 432 and 442 of the holes 413A and 413B and is controlled so that a filet functioning for inhibiting stress can be formed. By this step, as shown in FIG. 17B, the holes 413A and 413B can obtain round-shaped portions by which concentration of stress can be avoided. FIG. 17B is a cross-sectional view showing the shapes of the holes 413A and 413B formed when the volume of the material of the crankshaft is appropriately set. In a case of this condition setting, as shown in FIG. 18B, it was confirmed that the holes 413A and 413B had the round-shaped portions in the experimental example of the present invention. FIG. 18B is a photograph showing the holes 413A and 413B of the experimental example which was formed when the volume of the material is approximately set (the left photograph shows the hole 413A and the right photograph shows the hole 413B).

Figure 19A:
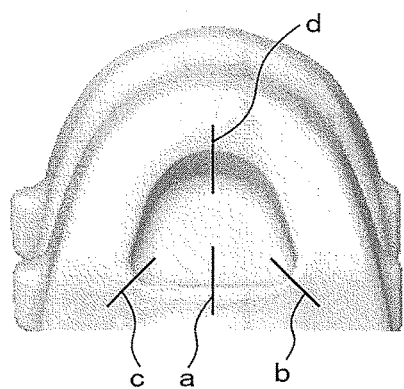
FIGS. 19A and 19B are photographs of holes of an experimental example in a case in which a volume of a material of the crankshaft is appropriate.
Figure 19B:
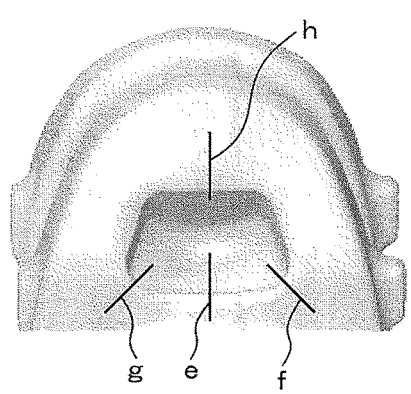

FIGS. 19A and 19B are photographs showing front views of the holed 413A and 413B of the experimental example which was formed when the volume of the material of the crankshaft is approximately set (the left photograph shows the hole 413A and the right photograph shows the hole 413B). As a result of calculating curvature deformations of the opening edges of the holes shown in FIG. 19A and FIG. 19B, each value of a curvature radius in each range was as follows. A value in a range "a" was 1.0 to 2.0, a value in a range "b" was 1.0 to 1.5, a value in a range "c" was 1.0 to 1.5, a value in a range "d" was 1.5 to 2.5, a value in a range "e" was 1.0 to 1.5, a value in a range "1" was 1.0 to 1.5, a value in a range "g" was 1.0 to 1.5 and a value in a range "h" was 2.5 to 4.0. In the experimental example of the present invention, a fillet having the curvature radius of about 1.0 to 4.0 could be formed.

2-2-C-2. Formation of Fiber Flow

Figure 20A:
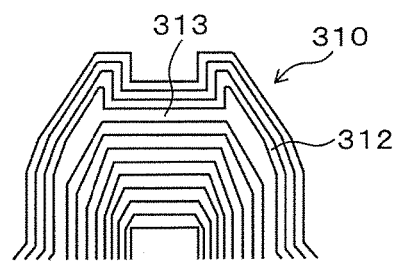
Figure 20B:
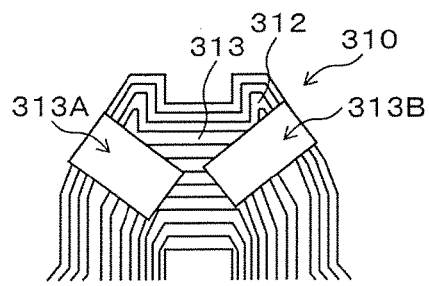
Figure 21:
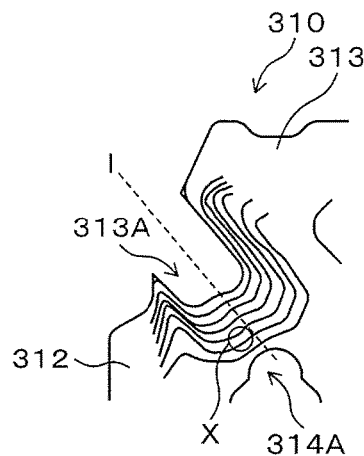
FIG. 21 is a conceptual diagram of a fiber flow in a portion in the vicinity of a hole formed in the forged crankshaft by the forging.

FIGS. 20A and 20B are views showing a fiber flow formed in a crankshaft 310 formed in forging and is a conceptual diagram of the fiber flow in the crankshaft 310 before machining, and FIG. 20B is a conceptual diagram of the fiber flow in the crankshaft 310 after the machining. FIG. 21 is a conceptual diagram of a fiber flow in a portion in the vicinity of a hole 313A formed in the crankshaft 310 by forging. Reference numeral "312" indicates an arm, reference numeral "313" indicates a crankpin, and reference numeral "314A" indicates a fillet in the FIG. 21.

In the solid crankshaft 310 obtained by forging containing plural working steps, as shown in FIG. 20A, even though the fiber flow is formed, when hollow holes 313A and 313B are formed in the crankshaft 310 by the machining, as shown in FIG. 20B, the fiber flow is broken.

Figure 22A:
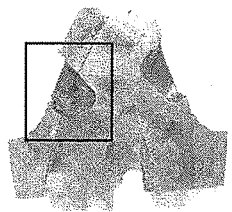
Figure 22B:
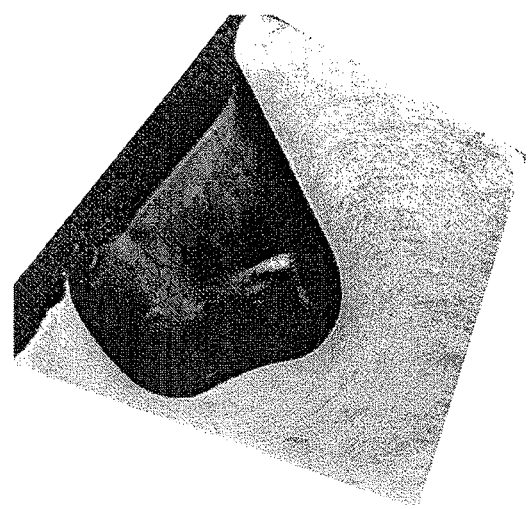

On the other hand, in forming the holes 313A and 313B by forging, as shown in FIG. 21, a fiber flow is newly formed along shapes of the holes 313A and 313B. Therefore, wear resistance can be improved compared to a drilled product by the machining. In the present embodiment, the holes 413A and 413B shown in FIG. 13 are formed by forging, so that the wear resistance can be improved. FIGS. 22A and 22B are photographs showing a condition of the crankshaft 310 in which the hole 313A is formed by the forging. FIG. 22A is a photograph showing a condition of an arm 310 containing the hole 313A and FIG. 22B is a photograph showing a condition of the hole 313A (a enlarged photograph of a portion in a rectangular area in FIG. 22A). As shown in FIGS. 22A and 22B, it was confirmed that, in the experimental example of the present invention, the fiber flow was newly formed along the shape of the hole.

2-2-C-3. Fining of Structure

The fillets 414A and 414B shown in FIGS. 13 and 14 (reference numeral "314A" in FIG. 21) are portions to which a connecting rod (not shown) abuts in rotation of the crankshaft 400, so that twisting stress and bending stress are easily concentrated thereto. Therefore, for strengthening the fillets 414A and 414B, a roll working method, a high-frequency hardening method, and nitriding are used.

However, in a nitriding treatment with respect to a steel material, a ferrite portion can be easily permeated by nitrogen compared to a pearlight portion. Therefore, when structures in which ferrite grains and pearlight grains are coarse are subjected to the nitriding treatment, a nitrided layer is formed according to a condition of the structures, so that large differences exist in hardening depth.

When the nitrided layer is deep from a surface and hard, an fatigue limit is improved. When the differences exist in the depth from the surface of the nitrided layer, strength distribution is not uniform and the strength is decreased. Stress in a bending reformation concentrates to a deep portion of the nitriding layer and breaks easily occur, so that the ferrite grains and the pearlight grains must be fined as small as possible for making the hardening depth after nitriding treatment uniform.

In the present embodiment, by forming the hole by the forging, structures of portions around the holes 413A and 413B in the crankpin 413 are fined along the shapes of the holes 413A and 413B. The structures of the portion around the holes 413A and 413B and those of the fillets 414A and 414B are also fined by forming the holes 413A and 413B by the forging, so that the nitrided layer can be formed easily and uniformly from the surface to a deep range of the portion.

Extending directions of the holes 413A and 413B preferably intersect with the fillets 414A and 414B for fining the structure of the portion containing the fillets 414A and 414B. In this case, the holes 413A and 413B are further preferably set in shapes in which straight lines (reference numeral "1" in FIG. 21) dividing each cross section area thereof in half on a cross section of the crankpin 413 containing an axis of the journal shaft 411 passes through a journal shaft 411 side surface of the crankpin 413.

Figure 23A:
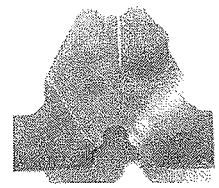
Figure 23B:
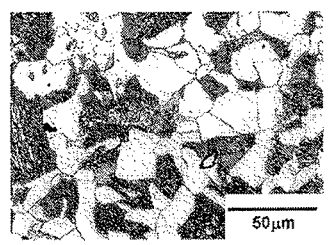
Figure 24A:
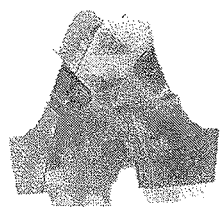
FIGS. 24A and 24B are photographs of a crankpin of an experimental example of the present invention, in which holes are formed by the forging, wherein 24A is a photograph of a total structure of the crankpin
Figure 24B:
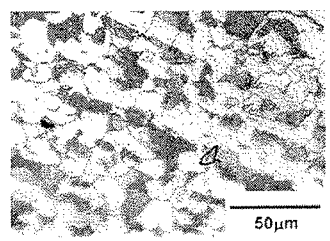

FIGS. 23A and 23B are views showing a crankpin in which a hole of the comparative example is not formed. FIG. 23A is a photograph of a total structure of the crankpin and FIG. 23B is a photograph taken by an optical microscope of a sectional structure of a portion of which a depth from a surface of the hole is 10 mm. FIGS. 24A and 24B are views showing a crankpin in which a hole is formed by forging of an experimental example of the present invention. FIG. 24A is a photograph of a total structure of the crankpin and FIG. 24B is a photograph taken by the optical microscope of a sectional structure of a range of which a depth from a surface of the hole is 10 mm. A structure composed of ferrite and pearlight (except for the nitrided layer) was formed in each of the experimental example and the comparative example. As shown in FIGS. 23A, 23B, 24A and 24B, the structure of the experimental example in which the hole is formed was fined compared to that of the comparative example in which the hole is not formed.

Figure 25:
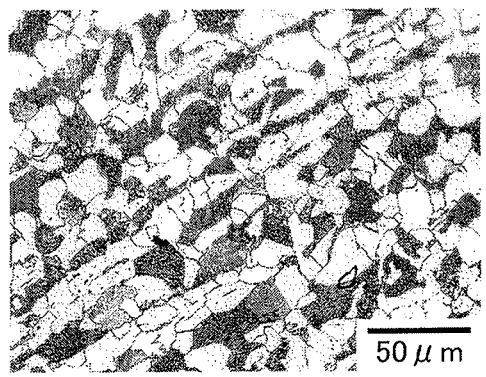
FIG. 25 is a photograph taken by the optical microscope of the crankpin of the experimental example of the present invention, in which the hole is formed by the forging and is a photograph of a structure of a vertical cross section of a range within 3 mm depth from a surface of a fillet.

FIG. 25 is a view showing a crankpin of the experimental example of the present invention in which a hole is formed by forging and is a photograph taken by an optical microscope of a vertically sectional structure of a range "X" (in FIG. 21, except for a soft nitrided layer) within 3 mm of a depth from a surface of the fillet. As shown in FIG. 25, an average diameter of crystal grains of ferrite was about 20 to 30% finer than that of the comparative example in which the hole is not formed. It was confirmed that by fining the compositions at a temperature of about 1000° C. in forging, fatigue strength could be improved.

As explained above, in the present embodiment, the bottom surface 431 of the hole 413A and the side surface 443A of the hole 413B, which are most proximate to the oil flow passage 423, are extended in a direction substantially parallel to the oil flow passage 423, so that each thickness of the walls between the surfaces 431 and 443A and the oil flow passage 423 is thin and the surface area of the arm 412 connected with the crankpin 413 is enlarged. Therefore, radiation performance of the arm 412 can be improved, so that a temperature of the oil flowing in the oil flow passage 423 can be lowered when a temperature of portions around a combustion chamber in a high-loaded operation of an internal-combustion engine is high. As a result, viscosity of oil can be improved, so that occurrence of seizing of the sliding portion of the crankshaft 400 can be avoided.

In particular, the holes 413A and 413B are formed by forging, so that forming the opening edges 432 and 4421 of the holes 413A and 413B in the sharp edge can be avoided, in contrast with machining, and therefore, a polishing step by hand working for avoiding stress concentration is unnecessary. As a result, the number of production steps can be reduced. Furthermore, the fiber flow is newly formed along the shapes of the hole 413A and 413B, so that wear resistance can be improved compared to the drilled product by machining.

In the forming by forging, the holes 413A and 413B are set in the shapes in which the straight lines dividing each cross section area thereof in half on the cross sections containing the axis of the journal shaft 411 of the crankpin 413 can pass through the journal shaft 411 side surface of the crankpin 413, so that the structure of the journal shaft 411 side surface of the crankpin 413 can be fine. As a result, the fatigue strength can be improved.

Example of Embodiment

The present invention is explained in detail with reference to specific examples of the invention hereinafter. In the examples, forging was performed using the forging apparatus 100 of the present embodiment in a condition in which the maximum length of the clearance between the preformed product 200 of the crankshaft and the cavity of the die set 103 was set at 0 mm (Comparative Example 11), 0.5 mm (Experimental Example 11), and 1 mm (Comparative Example 12).

Experiment conditions were set as follows. A carbon steel was used as a material of the preformed product 200, a heating temperature in the forging was set at 1100 to 1300° C., an inserting angle θ of a punch (shown in FIG. 5A) was set at 45°, wall thicknesses K (shown in FIG. 5A) between a bottom surface of a hole 213L and an oil flow passage 223 or between a side surface of a hole 213M and the oil flow passage 223 was set at 6 to 10 mm, a distance L (non-interacting amount) between an inserting passage of the punch and a counterweight 212A was set at 3 to 5 mm and a wall thickness N (curvature radius, shown in FIG. 5A) between the bottom surface of the hole 213M and a journal shaft 211 side surface of a crankpin 213 was set at 15 to 20 mm. Results are shown in Table 1 and FIG. 9.

Figure 9:
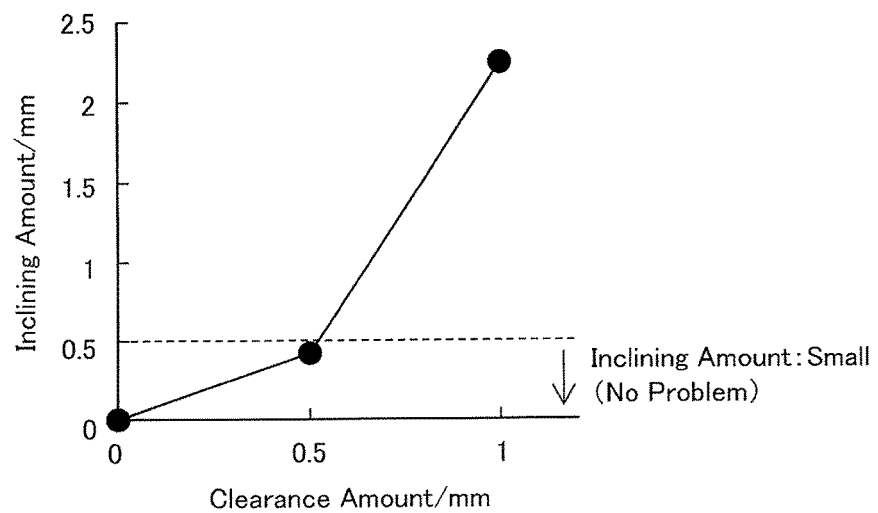
FIG. 9 is a graph showing a relationship between clearance amount and inclining amount obtained in an example of the present embodiment.
Figure 10:
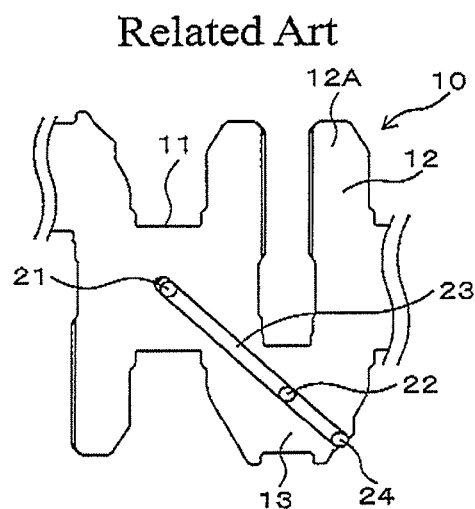
FIG. 10 a cross-sectional side view showing a schematic structure of a conventional crankshaft.
Figure 11:
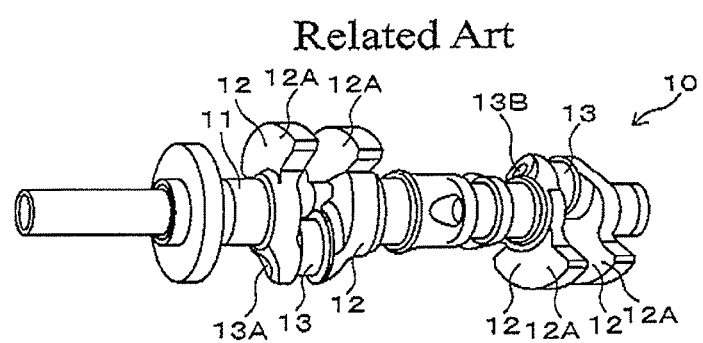
FIG. 11 is a schematic view showing the schematic structure of the conventional crankshaft.
Figure 12A:
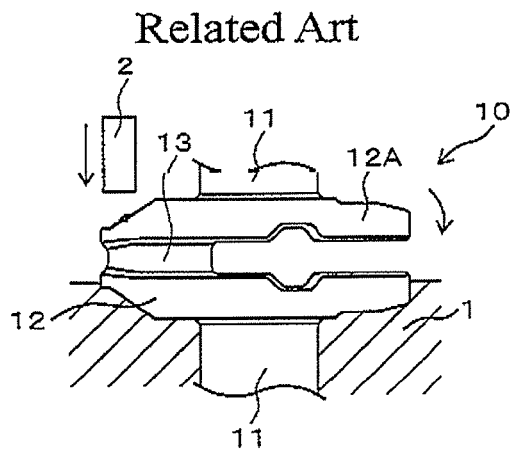
FIGS. 12A to 12C are diagrams for explanation of a conventional technique for forming a hole in a crankpin.
Figure 12B:
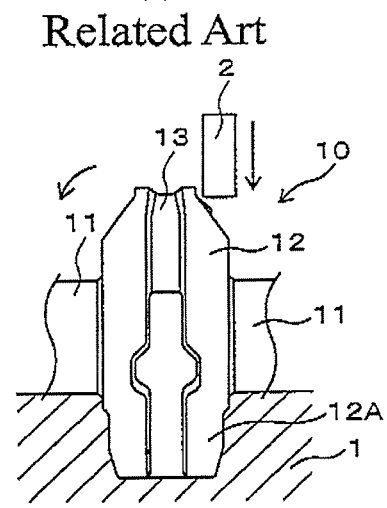
Figure 12C:
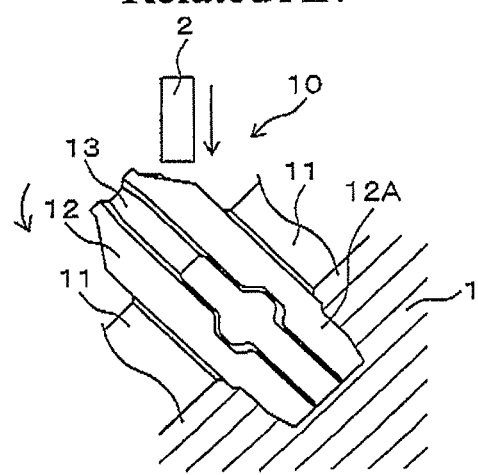

Set values of the maximum lengths C of the clearance and the inclining amounts obtained at each value of the maximum length C are shown in Table 1. FIG. 9 is a graph showing relationships between the maximum length C of the clearance and the inclining amount shown in Table 1. The inclining amount was obtained as the difference (=A−B) between a distance A (shown in FIG. 8A) between the counterweights from each other before inserting the punch and a distance B (shown in FIG. 8B) between the counterweights from each other after inserting the punch.

TABLE 1

|  | Clearance Maximum Length | Inclining Amount |
|---|---|---|
| Experimental Example 11 | 0.5 mm | 0.42 mm |
| Comparative Example 11 | 0 mm | 0 mm |
| Comparative Example 12 | 1 mm | 2.25 mm |

As shown in FIG. 9, in the Comparative Example 11 (shown in FIG. 7C) in which the maximum length C of the clearance is set at 0 mm, even though the inclining deformation did not occur, disposing the preformed product in the cavity of the die set was difficult. In the Comparative Example 12 (shown in FIG. 7B) in which the maximum length C of the clearance is set at 1 mm, large inclining deformation occurred (shown in FIG. 8B). On the other hand, in the Experimental Example 11 (shown in FIG. 7A) in which the maximum length C of the clearance is set at 0.5 mm, even though inclining deformation occurred, the amount of the inclining deformation was very small and was not a problem. In this case, disposing the preformed product in the cavity of the die set was easy.

As explained above, by setting the maximum length of the clearance between the preformed product and the cavity of the die set to be more than 0 mm and 0.5 mm or less, the preformed product can be easily disposed in the cavity of the die set. Furthermore, inclining deformation in forging of the counterweight of the crankshaft can be avoided.

What is claimed is:

1. A crankshaft comprising:
a crankpin; and
a journal shaft,
the crankpin comprising:
a columnar portion having an axis;
a pair of side surface portions that hold the columnar portion;
holes having a hollow structure formed in the columnar portion of the crankpin and respectively extending from the pair of side surface portions in an inclined direction with respect to the axis of the columnar portion; and
an oil flow passage formed in an inside of the columnar portion;
wherein each of the holes is defined by plural surfaces, with one surface of the plural surfaces that is most proximate to the oil flow passage extended in a direction substantially parallel to the oil flow passage, and
each hole of the holes has a shape that contains a straight line that divides a line segment of a base of the hole in half and is parallel to a side surface of the hole on a cross section containing an axis of the journal shaft and the axis of the columnar portion and passes through a journal shaft side surface of the crankpin.

2. The crankshaft according to claim 1, wherein the holes comprise:
a first hole formed in the columnar portion of the crankpin on one side surface portion of the pair of side surface portions of the crankpin; and
a second hole formed in the columnar portion of the crankpin on another side surface portion of the pair of side surface portions of crankpin;
wherein the plural surfaces defining the first hole include a bottom surface of the first hole having an area larger than that of a bottom surface of the second hole included in the plural surfaces defining the second hole, and a depth of the first hole from the one side surface portion of the crankpin to the bottom surface of the first hole is smaller than a depth of the second hole from the other side surface portion of the crankpin to the bottom surface of the second hole.

3. The crankshaft according to claim 1, wherein the holes comprise:
a first hole formed in the columnar portion of the crankpin on one side surface portion of the pair of side surface portions of the crankpin; and
a second hole formed in the columnar portion of the crankpin on another side surface portion of the pair of side surface portions of crankpin;
wherein the one surface of the plural surfaces defining the first hole that is most proximate to the oil flow passage is a bottom surface of the first hole, and the one surface of the plural surfaces defining the second hole that is most proximate to the oil flow passage is a side surface of the second hole.

4. The crankshaft according to claim 1, wherein the oil flow passage communicates a pin side through hole provided in the crankpin and a journal shaft side through hole provided in the journal shaft.

5. The crankshaft according to claim 1, wherein the holes comprise:
a first hole formed in the columnar portion of the crankpin on one side surface portion of the pair of side surface portions of the crankpin; and
a second hole formed in the columnar portion of the crankpin on another side surface portion of the pair of side surface portions of crankpin;
wherein the first hole extends in a direction substantially perpendicular to the oil flow passage, and the second hole extends in a direction substantially parallel to the oil flow passage.

* * * * *